US007005552B2

(12) United States Patent
Kaushiva

(10) Patent No.: US 7,005,552 B2
(45) Date of Patent: Feb. 28, 2006

(54) SINGLE REACTOR SYNTHESIS OF KOH-CAPPED POLYOLS BASED ON DMC-SYNTHESIZED INTERMEDIATES

(75) Inventor: Bryan D. Kaushiva, Hurricane, WV (US)

(73) Assignee: Bayer Materialscience LLC, Pittsburgh, PA (US)

( * ) Notice: Subject to any disclaimer, the term of this patent is extended or adjusted under 35 U.S.C. 154(b) by 75 days.

(21) Appl. No.: 10/699,951

(22) Filed: Nov. 3, 2003

(65) Prior Publication Data

US 2005/0096488 A1 May 5, 2005

(51) Int. Cl.
*C07C 41/02* (2006.01)

(52) U.S. Cl. ...................... 568/620; 568/621; 568/679; 568/680

(58) Field of Classification Search ................ 568/620, 568/621, 679, 680; 521/50
See application file for complete search history.

(56) References Cited

U.S. PATENT DOCUMENTS

| | | | | |
|---|---|---|---|---|
| 3,427,256 | A | 2/1969 | Milgrom | 252/431 |
| 3,427,335 | A | 2/1969 | Herold | 260/429 |
| 3,715,402 | A | 2/1973 | Louvar et al. | 260/613 B |
| 3,823,145 | A | 7/1974 | Louvar et al. | 260/268 PL |
| 3,829,505 | A | 8/1974 | Herold | 260/611 B |
| 3,941,849 | A | 3/1976 | Herold | 260/607 A |
| 4,110,268 | A | 8/1978 | Longley et al. | 521/177 |
| 4,355,188 | A | 10/1982 | Herold et al. | 568/620 |
| 4,472,560 | A | 9/1984 | Kuyper et al. | 526/120 |
| 4,477,589 | A | 10/1984 | van der Hulst et al. | 502/169 |
| 4,721,818 | A | 1/1988 | Harper et al. | 568/120 |
| 5,144,093 | A | 9/1992 | Reisch et al. | 568/621 |
| 5,158,922 | A | 10/1992 | Hinney et al. | 502/175 |
| 5,470,813 | A | 11/1995 | Le-Khac | 502/175 |
| 5,482,908 | A | 1/1996 | Le-Khac | 502/156 |
| 5,536,883 | A | 7/1996 | Le-Khac | 568/620 |
| 5,545,601 | A | 8/1996 | Le-Khac | 502/156 |
| 5,563,221 | A | 10/1996 | Pazos | 525/409 |
| 5,605,939 | A | 2/1997 | Hager | 521/137 |
| 5,648,559 | A | 7/1997 | Hager | 568/620 |
| 5,700,874 | A | 12/1997 | Takeichi et al. | 525/288 |
| 5,714,428 | A | 2/1998 | Le-Khac | 502/159 |
| 6,008,263 | A | 12/1999 | Thompson et al. | 521/174 |
| 6,077,978 | A | 6/2000 | McDaniel et al. | 568/620 |
| 6,815,467 | B1 | 11/2004 | Toyota et al. | 521/174 |
| 2004/0064001 | A1 * | 4/2004 | Ehlers et al. | 568/672 |

FOREIGN PATENT DOCUMENTS

| | | | |
|---|---|---|---|
| JP | 51101099 | * | 9/1976 |
| JP | 5-25267 | | 2/1993 |

* cited by examiner

*Primary Examiner*—Rosalynd Keys
(74) *Attorney, Agent, or Firm*—Joseph C. Gil; John E. Mrozinski, Jr.

(57) ABSTRACT

The present invention relates to processes for preparing ethylene oxide (EO)-capped polyols in which removal of catalyst residues or salts formed by the neutralization of the basic catalyst is not required prior to discharging the polyol from the reactor because neutralization occurs during or after the starter charge of a subsequent batch. The inventive processes allow for the preparation of DMC-catalyzed intermediates and their base-catalyzed EO caps within the same reactor. Polyols produced by the processes of the invention have a high content of primary hydroxyl groups and may be useful for producing polyurethane foams, elastomers, sealants, coatings, adhesives and the like.

42 Claims, No Drawings

SINGLE REACTOR SYNTHESIS OF KOH-CAPPED POLYOLS BASED ON DMC-SYNTHESIZED INTERMEDIATES

FIELD OF THE INVENTION

The present invention relates in general to catalysis and more particularly to processes for preparing polyols within a single reactor by catalyzing an intermediate with a double metal cyanide (DMC) complex catalyst and base-catalyzing an ethylene oxide (EO)-cap. The inventive processes do not require removal of catalyst residues from the reactor prior to feeding the starter charge for the next polyol batch or of salts formed by the neutralization of the basic catalyst. Polyols made by the inventive processes have a high content of primary hydroxyl groups and intrinsically low levels of unsaturation.

BACKGROUND OF THE INVENTION

Ethylene oxide (EO)-capped polyols are valuable in the polyurethane industry because the primary hydroxyl groups of EO-capped polyols react favorably with polyisocyanates. Ethylene oxide-capped polyols are typically produced by a multi-step process. First, propylene oxide (PO) (or a mixture of PO and EO) is polymerized in the presence of a basic catalyst (usually potassium hydroxide (KOH)) to produce a polyol containing mostly secondary hydroxyl groups. In the second step, EO is added to the catalyst-containing mixture to convert some or most of the secondary hydroxyl groups to primary hydroxyl groups. The typical process uses the same catalyst (usually KOH) for both propoxylation and ethoxylation. After the addition of EO is complete, the basic catalyst is either neutralized with an acid and the precipitated salt is separated from the polyol by filtration or centrifugation, or the basic catalyst is removed with an ion exchanger, coalescer, absorbent or any of the other techniques known in the art to produce a neutralized polyol.

DMC catalysts can be used to produce polyether, polyester and polyetherester polyols. These polyols may be used to produce polyurethane coatings, elastomers, sealants foams, adhesives and the like. DMC catalysts, such as zinc hexacyanocobaltate, offer many advantages in the production of polyether polyols. For example, DMC catalysts can be used to produce polyether polyols that have intrinsically low unsaturation levels compared to polyether polyols produced by basic (KOH) catalysis.

The various advantages of using low unsaturation polyols in the production of polyurethanes have been described in the following disclosures: EP 0 876 416; U.S. Pat. No. 5,700,847; and WO 99/51657. Improvements in DMC catalyst technology have provided catalysts with increased activity for epoxide polymerization. See, e.g., U.S. Pat. Nos. 5,470,813; 5,482,908; 5,545,601; and 5,714,428.

Despite the many advantages of using DMC catalysts in the production of polyols, one important drawback remains, that is, DMC catalysts are inefficient at adding oxyethylene groups to high equivalent weight polyols for the purpose of raising the average primary hydroxyl content. Ethylene oxide cannot be added to "cap" an oxypropylene polyol prepared by DMC catalysis, as is done in KOH catalysis. As the endgroup concentration becomes critically low, at hydroxyl numbers below about 50 mg KOH/g, additional oxyethylene preferentially adds to existing primary groups and a good distribution is not achieved. It therefore becomes impractical to utilize DMC catalysis for adding oxyethylene for the purpose of raising primary hydroxyl content. Where EO is added to a high equivalent weight polyoxypropylene polyol produced by DMC catalysis, the resulting product is a heterogeneous mixture of: (1) unreacted polyoxypropylene polyol; and (2) highly ethoxylated polyoxy-propylene polyol and/or polyethylene oxide. As a result, the product produced by an EO-capped polyoxypropylene polyol, which was produced by DMC catalysis, is hazy and, at times, solid at room temperature.

Several different processes have been developed in attempting to overcome this drawback. These processes involve preparing an EO-capped polyol from a DMC-catalyzed polyol with "re-catalysis". Re-catalysis involves preparing an oxypropylene polyol by DMC catalysis, adding a basic catalyst to the DMC-catalyzed oxypropylene polyol and then adding EO to cap the polyol.

For example, U.S. Pat. No. 4,355,188 discloses a process that involves capping a DMC-catalyzed polyol with EO while the polyol is in contact with a strong base. The strong base is removed from the polyol after EO capping is complete. The work-up of this polyol can be accomplished by neutralization of the strong base with a strong acid, for example sulfuric or phosphoric acid, as well as separation of the precipitated salt by filtration or centrifugation. If the precipitated salt is allowed to remain in the polyol, blockages in foaming equipment will result. Additionally, precipitated salts remaining in the polyol can adversely impact the physical properties of the polyol.

The use of ion exchangers provides another potential method of removing the basic catalyst following the production of EO-capped polyols via the re-catalysis method. (See Kirk-Othmer, *Encyclopedia Of Chemical Technology,* 2nd Ed., Vol. 11, 1966, Interscience Publishers, New York, pages 871 to 899.)

EO capping by a re-catalysis approach thus imposes additional processing costs from several factors. The addition of the new catalyst and its preparation must be effectively managed, either by adding directly or through a heel. But any re-catalysis adds an additional processing step that incurs increased manufacturing cost and decreased efficiency. The requirement of a refining step for removing the basic catalyst adds another process and associated manufacturing costs.

An additional and very significant drawback to the re-catalysis method lies in the requirement of two reactors instead of one. As those skilled in the art are aware, basic catalysts act as poisons to DMC catalysts. The typical re-catalysis manufacturing method is therefore to synthesize the DMC-catalyzed intermediate in one reactor and add the base-catalyzed EO cap in a second, different reactor. This two-reactor method decreases efficiency in the manufacturing process.

Japanese Kokai H5-25267 discloses a process in which re-catalysis is carried out with an aqueous solution of KOH. Following the addition of an aqueous solution of KOH, but before the addition of a certain amount of monoepoxide having 3 or more carbon atoms, water is removed to a certain level. EO is added to convert secondary hydroxyl groups to primary hydroxyl groups. However, to remove the added catalyst, work-up of the polyol is necessary after EO-capping.

U.S. Pat. No. 5,144,093 discloses a process in which a DMC catalyst residue-containing polyol is reacted with an oxidant to cause the catalyst residue to form insoluble residues. The insoluble residues are separated from the polyol to produce a polyol which is essentially free of DMC catalyst residues. The insoluble residues are separated from the polyol before it is treated with a base to provide a base-treated polyol that is reacted with EO to produce an EO-capped polyol.

A process for preparing EO-capped polyols from DMC-catalyzed polyols without using re-catalysis is disclosed in U.S. Pat. No. 5,563,221. The '221 patent teaches a first polyol prepared with a DMC catalyst blended with a second polyol prepared with a basic catalyst, in which the basic catalyst is present in an amount from 0.05 wt. % to about 2 wt. %, based on the total weight of the polyol blend. The polyol blend is reacted with EO to produce an EO-capped polyol. The basic catalyst is present in a concentration that allows for deactivation of the DMC catalyst as well for catalyzing ethoxylation of the polyol blend. Following ethoxylation, the EO-capped polyol is purified to remove catalyst residues.

Thus, while the art discloses processes for producing EO-capped polyols in the presence of DMC catalysts, these teachings all require the removal of catalyst residue(s) or salt(s) formed by the neutralization of a basic catalyst. Moreover, the art does not provide for neutralizing residue (i.e., the "heel") from the base-catalyzed capping step of preceding polyol batches in the reactor used for DMC synthesis. It is assumed that either sufficiently rigorous cleaning of the reactor has taken place between batches or that a two reactor process has been used. Either of those approaches adds processing costs and decreases efficiency.

In U.S. Pat. No. 6,077,978, the starting mixture (referred to as the "heel") is acidified to neutralize residual alkalinity in the glycerin during the subsequent continuous-addition-of-starter (CAOS) feed or basic impurities in the actual starter itself. The "heel" in the '978 patent is the entire starting charge and is acidic and the goal is prevention of DMC catalyst deactivation in an all-DMC reactor.

The art also discloses a process for neutralizing polyether polyols produced by basic catalysis. U.S. Pat. No. 4,110,268 discloses neutralizing, with dodecylbenzene sulfonic acid (DDBSA), a polyether polyol prepared by basic catalysis. This neutralization step results in the reduction or elimination of purification procedures. The '268 patent, however, is directed to producing polyether polyols by basic catalysis, without using "extraneous" catalysts. The '268 patent also discloses that even when "extraneous" catalysts are required in the polyol foam formulation, "very substantially" reduced amounts of the "extraneous" catalysts are used. The use of some soluble acids such as DDBSA to neutralize conventional levels of basic catalysts (e.g. 0.1–1 wt. % KOH based on the final product) can create an additional problem in that some applications (i.e., flexible foam production) have extreme sensitivity to the presence of surface active agents, such as the salt of DDBSA. The '268 patent does not disclose a method for minimizing the presence of such byproducts.

Therefore, a need exists in the art for a process for ethylene oxide (EO)-capping double metal cyanide (DMC)-catalyzed intermediates within a single reactor. It is furthermore desirable to develop a process that minimizes the presence of surface-active byproducts in the final polyol product.

SUMMARY OF THE INVENTION

Accordingly, the present invention provides processes for preparing EO-capped polyols in which removal of catalyst residues or salts formed by the neutralization of the basic catalyst is not required prior to product discharge from the reactor following the capping step. The basic heel is neutralized during or after the starter charge of the subsequent batch by the method of this invention, and this allows for the preparation of DMC-catalyzed intermediates and their base-catalyzed EO caps within the same reactor. The present invention also provides for the minimization of any remaining surface-active byproducts, such as the salt of DDBSA.

Polyols produced by the inventive processes have a high content of primary hydroxyl groups and lower unsaturation levels than polyols produced using only basic (KOH) catalysts. The polyols made by the processes of the present invention are useful for producing polyurethane foams, coatings, adhesives, sealants, elastomers and the like.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Unless otherwise specified, all molecular weight(s) and equivalent weight(s) as used herein are expressed in Da (Daltons) and are the number average molecular weight(s) and number average equivalent weight(s), respectively.

The present invention provides processes for preparing ethylene oxide (EO)-capped polyols in which removal of catalyst residues or salts formed by the neutralization of the basic catalyst prior to product discharge from the reactor following the capping step. The basic heel is neutralized during or after the starter charge of the subsequent batch by the method of this invention, and this allows for the preparation of DMC-catalyzed intermediates and their base-catalyzed EO caps within the same reactor.

In one embodiment of the present invention, a starter polyol charged to the reactor contains sufficient acid to neutralize the heel from a previous batch of ethylene oxide (EO)-capped polyol. EO-capped polyols are thus prepared by a process involving charging a reactor with starter containing acid sufficient to acidify residual basicity in the reactor from a previous batch of ethylene oxide (EO)-capped polyol, with the proviso that no precipitate is formed by reaction of the acid with the residual basicity, adding and activating a double metal cyanide (DMC) catalyst, feeding one or more oxyalkylenes to the reactor to produce a DMC-catalyzed polyol, adding a basic catalyst to the double metal cyanide (DMC)-catalyzed polyol to form a mixture comprising less than 3 wt. %, based on the total weight of the mixture, of the basic catalyst, or adding to the double metal cyanide (DMC)-catalyzed polyol, an unrefined polyol prepared in the presence of a basic catalyst to form a mixture comprising less than 25 wt. %, based on the total weight of the mixture, of base-catalyzed polyol and less than 3 wt. %, based on the total weight of the mixture, of the basic catalyst and ethoxylating the mixture at a temperature of from 85° C. to 220° C. to produce an EO-capped polyol. The residue from this batch in the reactor is the basic heel which will be acidified with the starter charge of the subsequent batch.

In another embodiment of the present invention, EO-capped polyols are prepared by charging a reactor with starter, acidifying residual basicity in the reactor from a previous batch of ethylene oxide (EO)-capped polyol by adding an acid, with the prone so that no precipitate is formed by reaction of the acid with the residual basicity, adding and activating a double metal cyanide (DMC) catalyst, feeding one or more oxyalkylenes to the reactor to produce a DMC-catalyzed polyol, adding a basic catalyst to the double metal cyanide (DMC)-catalyzed polyol to form a mixture comprising less than 3 wt. %, based on the total weight of the mixture, of the basic catalyst or adding to the double metal cyanide (DMC)-catalyzed polyol, an unrefined polyol prepared in the presence of a basic catalyst to form a mixture comprising less than 25 wt. %, based on the total weight of the mixture, of base-catalyzed polyol and less than 3 wt. %, based on the total weight of the mixture, of the basic catalyst and ethoxylating the mixture at a temperature of from 85° C. to 220° C. to produce an EO-capped polyol.

The starter compound in the processes of the present invention may be any compound that has active hydrogen atoms. The most preferred equivalent weight of the starter compound varies according to the methodology of production. In batchwise production, suitable starter compounds include compounds having equivalent weights from 30 to 1,000, more preferably, from 100 to 400, and having from 1 to 8 hydroxyl groups. The equivalent weight of the starter compound may be in an amount ranging between any combination of these values, inclusive of the recited values. In continuous addition of starter (CAOS) processing, suitable starter compounds include compounds at higher equivalent weights. Such starter compounds have equivalent weights of less than 5,000, more preferably less than 3,000 and having from 1 to 8 hydroxyl groups. Preferred starter compounds include, but are not limited to, polyoxypropylene polyols, polyoxyethylene polyols, polytetratramethylene ether glycols, glycerol, propoxylated glycerols, tripropylene glycol, alkoxylated allylic alcohols, propylene glycol, bisphenol A, pentaerythritol, sorbitol, sucrose, degraded starch, water and mixtures thereof.

Any strong or weak acid which does not form a salt that precipitates from the polyol can be used in processes of the present invention to acidify the residual basicity from a previous batch of EO-capped polyol made in the reactor.

All Brönsted acids and combinations thereof having pH-values of 14 or less under standard conditions are suitable, provided that the acids do not form salts insoluble in the EO-capped polyol. Examples of such acids include, but are not limited to, inorganic acids, such as sulfuric acid, phosphoric acid, nitric acid and periodic acid; organic acids such as sulfonic acids and their derivatives; carboxylic acids such as formic acid, acetic acid, propionic acid and benzoic acid; derivatives of carboxylic acids such as hydroxyl carbonic acid, lactic acid, mercaptosuccinic acid, thiolactic acid, mandelic acid, malic acid and tartaric acid; dicarboxylic acids such as oxalic acid, malonic acid, succinic acid, fumaric acid and phthalic acid; halogenated organic acids and their derivatives such as 5-cholorsalicylic acid, trifluorolactic acid, 3,5-dibromosalicylic acid, and 3-fluoro-4-hydroxybenzoic acid; amino acids and their derivatives; boronic acids and their derivatives such as boric acid, methylboronic acid, butylboronic acid and 2-thiophenediboronic acid; phosphonic acids and their derivatives such as propylphosphonic acid, 3-aminopropylphosphonic acid, and phenylphosphonic acid, phosphonic acids such as phenylphosphinic acid; and arsenic acids such as o-arsanilic acid.

Preferred acids include alkylbenzene sulfonic acids; alkyltoluene sulfonic acids such as dodecylbenzene sulfonic acid (DDBSA) and dodecyltoluene sulfonic acid; and alkylnaphthalene sulfonic acids such as butyl- or amylnaphthalene sulfonic acid.

Any known double metal cyanide (DMC) catalyst may be used in the processes of the present invention. Suitable DMC catalysts are known in the art and are described in inter alia, U.S. Pat. Nos. 3,427,256; 3,427,335; 3,829,505; 4,477,589; 5,158,922; and 5,470,813, the entire contents of which are incorporated herein by reference thereto. Particularly preferred in the inventive processes are zinc hexacyanocobaltate catalysts.

DMC-catalyzed polyols useful in the processes of the present invention may be any polyols produced by DMC catalysis and prepared by any of the methods known in the art, such as reacting a heterocyclic monomer (such as an epoxide) with an active hydrogen-containing initiator (preferably a low molecular weight polyol) in the presence of a DMC catalyst. Suitable heterocyclic monomers, active hydrogen-containing initiators and methods for making polyols using DMC catalysis are described in U.S. Pat. Nos. 3,829,505; 3,941,849; 4,355,188; 4,472,560; and 5,482,908, the entire contents of which are incorporated herein by reference thereto, as well as in EP-A 700 949.

Preferred DMC-catalyzed polyols include polyoxypropylene polyols. The EO content of DMC-catalyzed polyols useful in the present invention may be in any range, but is preferably from 1 to 35 wt. %, more preferably, from 3 to 30 wt. %, and, most preferably, from 5 to 20 wt. %, based on the total weight of the DMC-catalyzed polyol. The EO content may be in an amount ranging between any combination of these values, inclusive of the recited values.

The DMC-catalyzed polyols useful in the processes of the present invention may include one or more random EO/PO co-polymer building blocks with EO and PO in a weight ratio of EO/PO in the range of from 1:99 to 75:25 or a polyoxypropylene interior building block and an exterior random EO/PO co-polymer building block having EO and PO in a weight ratio of EO/PO in the range of from 1:99 to 75:25.

DMC-catalyzed polyols useful in the processes of the present invention may be produced by alkoxylation of a hydroxyfunctional starter with a mixture of EO and PO. The EO concentration in the EO/PO mixture may be increased during alkoxylation as the molecular weight of the polyol increases. The EO concentration may be increased either "step-wise" or continuously. The DMC-catalyzed polyols useful in the processes of the present invention have nominal functionalities of from 2 to 8, more preferably, from 2 to 3; hydroxyl numbers of from 5 to 100 mg KOH/g, more preferably, from 15 to 45 mg KOH/g; molecular weights of from 1,000 to 40,000, more preferably, from 2,500 to 12,000; and low levels of unsaturation, i.e., less than 0.04 meq/g, preferably, less than 0.02 meq/g, and, more preferably, less than 0.01 meq/g and most preferably less than 0.007 meq/g.

Suitable oxyalkylenes in the processes of the present invention include, but are not limited to, propylene oxide, ethylene oxide, butylene oxide, isobutylene oxide, 1-butene oxide and 2-butene oxide.

Any basic or alkaline catalysts that de-activate the DMC catalyst and catalyze the reaction between EO and polyol may be used in the processes of the present invention. Examples of suitable basic catalysts include, but are not limited to, alkali and/or alkaline earth metals, solid alkali and/or alkaline earth hydroxides, alkoxides, hydrides and amines. Sodium hydroxide and potassium hydroxide are preferred.

Phase transfer catalysts may be used in the processes of the present invention in combination with basic or alkaline catalysts to increase the reaction rate of the basic catalyst.

Cyclic polyols such as crown ethers or cryptates are preferred phase transfer catalysts. Crown ethers and quaternary amine salts are also useful as phase transfer catalysts.

As mentioned hereinabove, alkoxides may be used in the processes of the present invention as basic catalysts. Methoxides are preferred. Alkoxides may be prepared either prior to the addition to the polyol or in situ by adding an alkali and/or alkaline earth metal and an alcohol to the polyol.

In the processes of the present invention where a basic catalyst is added to a DMC-catalyzed polyol to form a mixture, the concentration of basic catalyst in the mixture, prior to ethoxylation, is preferably less than 2 wt. %, and more preferably from 0.1 to 1 wt. %, based on the total weight of the mixture.

Prior to reacting the mixture with EO, traces of water may be removed from the mixture to prevent "carbowax" formation. "Carbowax" is defined as high molecular weight by-product in the ethoxylated polyol. Using gel permeation chromatography ("GPC") analysis of the ethoxylated polyol, carbowax can be identified by the presence of a second peak at molecular weights higher than the molecular weight of the ethoxylated polyol.

Ethoxylation of the mixture may be performed by heating the mixture to a desired reaction temperature and incrementally adding EO. A reaction temperature of from 85 to 220° C., preferably from 95 to 140° C., more preferably, from 110 to 130° C., is used in the processes of the present invention.

The total EO content of the EO-capped polyols produced by the processes of the present invention is from 5 to 45 wt. %, based on the total weight of the EO-capped polyol. After EO-capping is complete, the reaction mixture may either be kept at the same temperature that was used for ethoxylation or at a higher temperature to complete polymerization.

EO-capped polyols produced by the processes of the present invention may be further purified to eradicate catalyst residues after removal from the reactor vessel. Any suitable means of purifying EO-capped polyols can be used, including treatment with an ion-exchange resin, water washing or treatment with an absorbent such as magnesium silicate. Suitable methods for purifying EO-capped polyols are described in U.S. Pat. Nos. 3,715,402; 3,823,145; 4,721,818; 4,355,188 and 5,563,221, the entire contents of which are incorporated herein by reference thereto.

In the process of the present invention where an unrefined base-catalyzed polyol is added to a DMC-catalyzed polyol to form a mixture, the concentration of unrefined base-catalyzed polyol in the mixture is less than 25 wt. %, preferably from 0.1 to 15 wt. %, more preferably from 1 to 10 wt. %, based on the total weight of the mixture. The concentration of basic catalyst in the mixture, prior to ethoxylation, is preferably less than 3 wt. %, more preferably less than 2 wt. %, and most preferably from 0.1 to 1 wt. %, based on the total weight of the mixture.

It is preferred, but not necessary, for the DMC-catalyzed polyol and the unrefined base-catalyzed polyol have the same structure. Prior to reacting the mixture with EO, traces of water may be removed from the mixture to prevent carbowax formation.

Base-catalyzed polyols suitable in the processes of the present invention include any polyols produced by basic catalysis. Particularly preferred are polyoxypropylene polyols. Base-catalyzed polyols may further include random co-polymers of PO and EO. The total EO content of base-catalyzed polyols, before EO-capping, may be in the range of from 0 to 35 wt. %, based on the total weight of the base-catalyzed polyol. Base-catalyzed polyols may either be produced in the presence of a basic catalyst or by re-catalyzing a DMC-catalyzed polyol with a basic catalyst. The base-catalyzed polyols useful in the processes of the present invention preferably have nominal functionalities of from 2 to 8, more preferably, from 2 to 3; hydroxyl numbers of from 20 to 200 mg KOH/g, more preferably, from 30 to 60 mg KOH/g; number average molecular weights of from 600 to 10,000, more preferably, from 1,000 to 6,000.

Polyols produced by the processes of the invention have a high content of primary hydroxyl groups, i.e., from 50% to 95%, more preferably, from 70% to 90%. Additionally, the polyols produced by the processes of the invention have lower unsaturation levels than polyols produced using only basic (KOH) catalysts. The polyols produced by the inventive processes are useful for producing polyurethane foams, coatings, adhesives, sealants, elastomers and the like.

The present invention is further illustrated, but is not to be limited, by the following example.

EXAMPLE 1

A 29 liter stirred tank reactor was charged with a 701 Da triol (1867.2 g) having a hydroxyl number of 240. This triol contained 1 wt. % of the heel from a previous reactor batch (an unrefined polyol that still contained 0.5 wt. % KOH). The starter was neutralized with a 5% excess of dodecyl benzenesulfonic acid (DDBSA). Following neutralization, a zinc hexacyanocobaltate catalyst (0.45 g) was added. After purging and venting with nitrogen, the catalyst was activated at 130° C. by adding oxypropylene (94 g) and oxyethylene (11 g). The activation profile was representative for this amount of activation oxide at this temperature. Oxypropylene (11539 g) and oxyethylene (1339 g) were then added and reacted at 130° C. Subsequently, a 45 wt. % aqueous solution of KOH (172 g) was added to the DMC-catalyzed polyol to form a mixture. The reactor was dried by holding for three hours at 125° C. and less than 10 mm Hg with a nitrogen sparge. Oxypropylene (900 g) was subsequently added to eliminate traces of water from the mixture. After the reactor pressure had dropped to one-half of the starting pressure, excess oxypropylene was stripped off. The mixture containing 0.43 wt. % KOH was maintained at 130° C. and oxyethylene (2250 g) was added. The product was refined via ion exchange treatment. The resulting EO-capped polyol had a hydroxyl number of 24.9 mg KOH/g (compared to a target hydroxyl number of 25) and an 86% primary hydroxyl content. The product was clear.

The foregoing example of the present invention is offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for preparing an ethylene oxide (EO)-capped polyol comprising:

a) charging a reactor with starter containing acid sufficient to acidify residual basicity in the reactor from a previous batch of ethylene oxide (EO)-capped polyol, with the proviso that no precipitate is formed by reaction of the acid with the residual basicity;

b) adding and activating a double metal cyanide (DMC) catalyst;

c) feeding one or more oxyalkylenes to the reactor to produce a DMC-catalyzed polyol;

d) adding a basic catalyst to the double metal cyanide (DMC)-catalyzed polyol to form a mixture comprising less than about 3 wt. %, based on the total weight of the mixture, of the basic catalyst, or adding to the double metal cyanide (DMC)-catalyzed polyol, an unrefined polyol prepared in the presence of a basic catalyst to form a mixture comprising less than about 25 wt. %, based on the total weight of the mixture, of base-catalyzed polyol and less than about 3 wt. %, based on the total weight of the mixture, of the basic catalyst; and e) ethoxylating the mixture at a temperature of from about 85° C. to about 220° C. to produce an EO-capped polyol.

2. The process according to claim 1, wherein the double-metal cyanide (DMC) catalyst is zinc hexacyanocobaltate.

3. The process according to claim 1, wherein the basic catalyst is chosen from potassium hydroxide and sodium hydroxide.

4. The process according to claim 1, wherein the mixture comprises from about 0.05 to less than about 3 wt. %, based on the total weight of the mixture, of the basic catalyst.

5. The process according to claim 1, wherein the mixture comprises from about 0.1 to about 1 wt. %, based on the total weight of the mixture, of the basic catalyst.

6. The process according to claim 1, wherein the starter is chosen from polyoxypropylene polyols, polyoxyethylene polyols, polytetatramethylene ether glycols, glycerol, propoxylated glycerols, propylene glycol, tripropylene glycol, alkoxylated allylic alcohols, bisphenol A, pentaerythritol, sorbitol, sucrose, degraded starch, water and mixtures thereof.

7. The process according to claim 1, wherein the one or more oxyalkylenes are chosen from propylene oxide, ethylene oxide, butylene oxide, isobutylene oxide, 1-butene oxide and 2-butene oxide.

8. The process according to claim 1, wherein the double-metal cyanide (DMC)-catalyzed polyol is a polyoxypropylene polyol.

9. The process according to claim 1, wherein the double-metal cyanide (DMC)-catalyzed polyol includes a random or block copolymer of oxyethylene and oxypropylene.

10. The process according to claim 1, wherein the ethylene oxide (EO)-capped polyol is an ethylene oxide (EO)-capped polyether polyol.

11. The process according to claim 1, wherein the acid is chosen from inorganic acids, organic acids and derivatives thereof, carboxylic acids and derivatives thereof, dicarboxylic acids, halogenated organic acids and derivatives thereof, amino acids and derivatives thereof, boronic acids and derivatives thereof, phosphonic acids and derivatives thereof, phosphinic acids and arsenic acids.

12. The process according to claim 1, wherein the acid is chosen from sulfuric acid, phosphoric acid, nitric acid, periodic acid, sulfonic acids and their derivatives, formic acid, acetic acid, propionic acid, benzoic acid, hydroxyl carbonic acid, lactic acid, mercaptosuccinic acid, thiolactic acid, mandelic acid, malic acid, tartaric acid, oxalic acid, malonic acid, succinic acid, fumaric acid, phthalic acid, 5-cholorsalicylic, trifluorolactic acid, 3,5-dibromosalicylic acid, 3-fluoro-4-hydroxybenzoic acid, boric acid, methylboronic acid, butylboronic acid, 2-thiophenediboronic acid, propylphosphonic acid, 3-aminopropylphosphonic acid, phenylphosphonic acid, phenylphosphinic acid and o-arsanilic acid.

13. The process according to claim 1, wherein the acid is chosen from alkyl benzene sulfonic acids, alkyltoluene sulfonic acids and alkyl naphthalene sulfonic acids.

14. The process according to claim 1, wherein the acid is chosen from dodecylbenzene sulfonic acid (DDBSA), dodecyltoluene sulfonic acid and butyl-or amyl naphthalene sulfonic acid.

15. The process according to claim 1, wherein the acid is dodecylbenzene sulfonic acid (DDBSA).

16. The process according to claim 1, wherein the acid is lactic acid.

17. The process according to claim 1, wherein the step of ethoxylating is carried out at a temperature of from about 85° C. to about 180° C.

18. The process according to claim 1, wherein the step of ethoxylating is carried out at a temperature of from about 110° C. to about 140° C.

19. The process according to claim 1 further including a step of refining the ethylene oxide (EO)-capped polyol.

20. The process according to claim 19, wherein the step of refining includes treating the ethylene oxide (EO)-capped polyol with an ion exchange resin.

21. A process for preparing an ethylene oxide (EO)-capped polyol comprising:

a) charging a reactor with starter;

b) acidifying residual basicity in the reactor from a previous batch of ethylene oxide (EO)-capped polyol by adding an acid, with the proviso that no precipitate is formed by reaction of the acid with the residual basicity;

c) adding and activating a double metal cyanide (DMC) catalyst;

d) feeding one or more oxyalkylenes to the reactor to produce a DMC-catalyzed polyol;

e) adding a basic catalyst to the double metal cyanide (DMC)-catalyzed polyol to form a mixture comprising less than about 3 wt. % based on the total weight of the mixture, of the basic catalyst, or adding to the double metal cyanide (DMC)-catalyzed polyol, an unrefined polyol prepared in the presence of a basic catalyst to form a mixture comprising less than about 25 wt. %, based on the total weight of the mixture, of base-catalyzed polyol and less than about 3 wt. %, based on the total weigh of the mixture, of the basic catalyst; and f) ethoxylating the mixture at a temperature of from about 85° C. to about 220° C. to produce an EO-capped polyol.

22. The process according to claim 21, wherein the double-metal cyanide (DMC) catalyst is zinc hexacyanocobalte.

23. The process according to claim 21, wherein the basic catalys is chosen from potassium hyfroxide and sodium hydroxide.

24. The process according to claim 21, wherein the DMC-catalyzed polyol comprises from about 1 to less than about 35 wt. % ethylene oxide (EO).

25. The process according to claim 21, wherein the DMC-catalyzed polyol comprises from about 3 to about 30 wt. % ethylene oxide (EO).

26. The process according to claim 21, wherein the mixture comprises from about 5 to about 20 wt. %, based on the total weight of the mixture, of base-catalyzed polyol.

27. The process according to claim 21, wherein the basic catalyst comprises from about 0.5 to less than about 3 wt. %, based on the total weight of the mixture, of base-catalyzed polyol.

28. The process according to claim 21, wherein the starter is chosen from polyoxypropylene polyols, polyoxyethylene polyols, polytetatramethylene ether glycols, glycerol, propoxylated glycerols, propylene glycol, tripropylene glycol, alkoxylated allylic alcohols, bisphenol A, pentaerythritol, sorbitol, sucrose, degraded starch, water and mixtures thereof.

29. The process according to claim 21, wherein the one or more oxyalkylenes are chosen from propylene oxide, ethylene oxide, butylene oxide, isobutylene oxide, 1-butene oxide and 2-butene oxide.

30. The process according to claim 21, wherein the double-metal cyanide (DMC)-catalyzed polyol is a polyoxypropylene polyol.

31. The process according to claim 21, wherein the double-metal cyanide (DMC)-catalyzed polyol includes a random or block copolymer of oxyethylene and oxypropylene.

32. The process according to claim 21, wherein the ethylene oxide (EO)-capped polyol is an ethylene oxide (EO)-capped polyether polyol.

33. The process according to claim 21, wherein the acid is chosen from inorganic acids, organic acids and derivatives thereof, carboxylic acids and derivatives thereof, dicarboxylic acids, halogenated organic acids and derivatives thereof, amino acids and derivatives thereof, boronic acids and derivatives thereof, phosphonic acids and derivatives thereof, phosphinic acids and arsenic acids.

34. The process according to claim 21, wherein the acid is chosen from sulfuric acid, phosphoric acid, nitric acid, periodic acid, sulfonic acids and their derivatives, formic acid, acetic acid, propionic acid, benzoic acid, hydroxyl carbonic acid, lactic acid, mercaptosuccinic acid, thiolactic acid, mandelic acid, malic acid, tartaric acid, oxalic acid, malonic acid, succinic acid, fumaric acid, phthalic acid, 5-cholorsalicylic acid, trifluorolactic acid, 3,5-dibromosalicylic acid, 3-fluoro-4-hydroxybenzoic acid, boric acid, methylboronic acid, butylboronic acid, 2-thiophenediboronic acid, propylphosphonic acid, 3-aminopropylphosphonic acid, phenylphosphonic acid, phenylphosphinic acid and o-arsanilic acid.

35. The process according to claim 21, wherein the acid is chosen from alkylbenzene sulfonic acids, alkyltoluene sulfonic acids and alkyl naphthalene sulfonic acids.

36. The process according to claim 21, wherein the acid is chosen from dodecylbenzene sulfonic acid (DDBSA), dodecyltoluene sulfonic acid and butyl-or amyl naphthalene sulfonic acid.

37. The process according to claim 21, wherein the acid is dodecylbenzene sulfonic acid (DDBSA).

38. The process according to claim 21, wherein the acid is lactic acid.

39. The process according to claim 21, wherein the step of ethoxylating is carried out at a temperature of from about 85° C. to about 180° C.

40. The process according to claim 21, wherein the step of ethoxylating is carried out at a temperature of from about 110° C. to about 140° C.

41. The process according to claim 21 further including a step of refining the ethylene oxide (EO)-capped polyol.

42. The process according to claim 41, wherein the step of refining includes an ion exchange resin.

* * * * *